(12) United States Patent
Lai et al.

(10) Patent No.: US 6,976,641 B2
(45) Date of Patent: Dec. 20, 2005

(54) OPTICAL ELEMENTS AND METHODS FOR MAKING THEREOF

(75) Inventors: Shui T. Lai, Encinitas, CA (US); Larry Sverdrup, Poway, CA (US)

(73) Assignee: Ophthonix, Inc., San Diego, CA (US)

( * ) Notice: Subject to any disclaimer, the term of this patent is extended or adjusted under 35 U.S.C. 154(b) by 0 days.

(21) Appl. No.: 10/959,495

(22) Filed: Oct. 5, 2004

(65) Prior Publication Data

US 2005/0064105 A1 Mar. 24, 2005

Related U.S. Application Data

(62) Division of application No. 10/253,956, filed on Sep. 24, 2002, now Pat. No. 6,836,371.

(60) Provisional application No. 60/395,878, filed on Jul. 11, 2002.

(51) Int. Cl.$^7$ .......................... A62C 31/00; B05B 7/10; B05B 7/12
(52) U.S. Cl. .................. 239/398; 239/401; 239/406; 239/407; 239/409; 239/410; 239/569; 239/413
(58) Field of Search .................. 239/398, 401, 239/406, 407, 409, 413, 410, 569, 303, 304

(56) References Cited

U.S. PATENT DOCUMENTS

| | | | |
|---|---|---|---|
| 4,809,909 A | * | 3/1989 | Kukesh .......................... 239/1 |
| 4,810,070 A | | 3/1989 | Suda et al. |
| 5,080,472 A | | 1/1992 | Gupta |
| 5,148,205 A | | 9/1992 | Guilino et al. |
| 5,229,797 A | | 7/1993 | Futhey et al. |
| 5,235,352 A | | 8/1993 | Pies et al. |
| 5,304,001 A | * | 4/1994 | Kuo et al. .................. 366/132 |
| 5,498,444 A | | 3/1996 | Hayes |
| 5,585,968 A | | 12/1996 | Guhman et al. |
| 5,632,817 A | * | 5/1997 | Hiraga et al. ................ 118/663 |
| 5,681,757 A | | 10/1997 | Hayes |
| 5,707,684 A | | 1/1998 | Hayes et al. |
| 5,998,096 A | | 12/1999 | Umemoto et al. |
| 6,027,672 A | | 2/2000 | Weitzel et al. |
| 6,029,896 A | | 2/2000 | Self et al. |
| 6,086,204 A | | 7/2000 | Magnante |
| 6,089,711 A | | 7/2000 | Blankenbecler et al. |
| 6,294,217 B1 | | 9/2001 | Risen et al. |
| 6,315,410 B1 | | 11/2001 | Doshi |
| 6,394,613 B1 | | 5/2002 | Hatakeyama et al. |
| 6,406,138 B1 | | 6/2002 | Gore |

(Continued)

FOREIGN PATENT DOCUMENTS

DE     100 60 304 A1    6/2002

(Continued)

OTHER PUBLICATIONS

"Adaptive Optics Technology Provides Powerful Tools for Eye Doctors," Science Daily Magazine, Jun. 24, 2002, http://www.sciencedaily.com/releases/2002/06/020624072333.htm.

(Continued)

*Primary Examiner*—Davis Hwu
(74) *Attorney, Agent, or Firm*—Morrison & Foerster LLP

(57) ABSTRACT

Optical elements are made using micro-jet printing methods to precisely control the type, position and amount of polymer deposited onto a substrate. In preferred embodiments, the proportions of two or more different polymer compositions are varied over the course of the deposition process to deposit adjoining polymer pixels in the form of a film on the substrate surface. The optical properties of each adjoining polymer pixel can be selected to provide a predetermined optical property, including a specific value of index of refraction. Preferably, the film has a radially non-monotonic refractive index profile and/or an angularly non-monotonic refractive index profile.

8 Claims, 10 Drawing Sheets

● High index of refraction polymer
○ Low index of refraction polymer

U.S. PATENT DOCUMENTS

| | | |
|---|---|---|
| 6,499,843 B1 | 12/2002 | Cox et al. |
| 6,761,454 B2 | 7/2004 | Lai et al. |
| 6,781,681 B2 | 8/2004 | Horwitz |
| 6,786,602 B2 | 9/2004 | Abitol |
| 2001/0048968 A1 | 12/2001 | Cox et al. |
| 2002/0080464 A1 | 6/2002 | Bruns |
| 2003/0020768 A1 | 1/2003 | Renn |
| 2003/0048314 A1 | 3/2003 | Renn |

FOREIGN PATENT DOCUMENTS

| | | |
|---|---|---|
| EP | 0 675 385 B1 | 10/1995 |
| EP | 0 735 401 B1 | 10/1996 |
| EP | 1 338 345 A1 | 8/2003 |
| WO | WO 00/41650 | 7/2000 |

OTHER PUBLICATIONS

Andreottola, Michael A., "Ink Jet Technology," Chapter 12, pp. 527-544 in "Handbook of Imaging Materials," 1991.

Bares, Steven J.; "Papers and Films for Ink Jet Printing;" Chapter 13, pp. 545-562 in "Handbook of Imaging Materials," 1991.

Cox, W. Royall, et al.; "Micro-Optics Fabrication by Ink-Jet Printing," Optics and Photonics News, pp. 32-35, Jun. 2001.

Hayes, Donald J. et al.; "Micro-Jet Printing of Polymers for Electronics Manufacturing," IEEE, pp. 168-173, 1998.

Trost, H. J.; "Using Drop-On Demand Technology for Manufacturing GRIN Lenses," Proc. 2001 Ann. Mtg. ASPE, 10-15, Nov. 2001 (ASPE Raleigh NC 2001), pp. 533-536.

* cited by examiner

- 💧 High index of refraction polymer
- 💧 Low index of refraction polymer

- ◐ High Index Polymer
- ◊ Low Index Polymer

Cylinder

Focus

Z(5,5)

Z(6,0)

Human Eye

Human Eye Correction

OPTICAL ELEMENTS AND METHODS FOR MAKING THEREOF

RELATED APPLICATION INFORMATION

This application is a divisional of U.S. patent application Ser. No. 10/253,956, filed Sep. 24, 2002 now U.S. Pat. No. 6,836,371, which claims priority to U.S. Provisional Patent Application No. 60/395,878, filed Jul. 11, 2002, both of which are hereby incorporated by reference in their entireties. Disclosure Documents No. 514428, deposited with the U.S. Patent and Trademark Office on Jun. 28, 2002, is also incorporated by reference in its entirety.

BACKGROUND OF THE INVENTION

1. Field of the Invention

This invention relates to optical elements and methods of making them by using micro-jet printing methods to precisely control the type, position and amount of polymer deposited onto a substrate.

2. Description of the Related Art

Optical elements such as eyeglass lenses are typically made by casting, grinding and/or polishing blanks made from glass or plastics such as polycarbonate and polyethylene glycol diallyl dicarbonate (CR39). However, lenses made by these fabrication techniques are only capable of correcting relatively simple vision problems. Other fabrication techniques have been developed to address more complex vision problems, but these techniques are uneconomical because they are relatively complicated and not well-suited for mass production.

Lens elements with a spatially varying index of refraction are known, see, e.g., U.S. Pat. No. 6,089,711. The material for the fabrication of such lenses can be made by a variety of processes such as sol-gel, infusion, and diffusion. However, these fabrication techniques produce lenses having a radial gradient profile in which the index of refraction increases or decreases monotonically across the radius of the lens because the gradient is obtained by a diffusion process. These fabrication techniques are inapplicable to the manufacture of lenses in which the index of refraction at any particular point can be specified in a controlled manner to produce a radially non-monotonic refractive index profile. Arrays of microlenses have been made by irradiating a photopolymerizable or photocrosslinkable substance with laser light having an uneven distribution of intensity, see U.S. Pat. No. 5,998,096. However, the presence of unreacted photoreactive substances remaining within the irradiated article often presents stability problems.

Micro-jet printing methods have been reported which are said to be capable of printing arrays of microlenses onto a substrate, see U.S. Pat. Nos. 5,498,444; 5,707,684; and W. Royall Cox et al., "Micro-Optics Fabrication by Ink-Jet Printing," Optics and Photonics News, pp. 32–35, June 2001. Methods have also been reported for modifying the surface of lenses to correct for optical aberrations, see U.S. Pat. No. 6,086,204. However, such methods seek to control optical properties by controlling the thickness of the lens, rather than by controlling the refractive index of the material from which the lens is made. Methods have also been reported for varying the effective index of refraction by using lithographic methods to produce very small bore holes in the lens material, see U.S. Pat. No. 5,585,968.

SUMMARY OF THE INVENTION

The present invention relates to optical elements and methods for making them by depositing controlled amounts of polymers onto a substrate with a high degree of spatial resolution to form polymer pixels. In preferred embodiments, selected amounts of two or more polymer compositions, each having a different individual optical property, are deposited onto the substrate in a manner that averages the individual optical properties at any particular point in the resulting optical element. For example, two polymers, each having a different refractive index, may be deposited onto a surface in controlled proportions that vary as a function of position across the surface of the substrate, resulting in an optical element in which the refractive index varies in a desired fashion as a function of position within the element.

Preferred methods provide exceptionally precise control over optical properties as a function of position within the optical element, and thus provide optical elements having unique optical properties. Preferred optical elements include lenses that can correct relatively complicated or higher order aberrations that may cause vision problems.

These and other embodiments are described in greater detail below.

BRIEF DESCRIPTION OF THE DRAWINGS

These and other aspects of the invention will be readily apparent from the following description and from the appended drawings (not to scale), which are meant to illustrate and not to limit the invention, and wherein.

DETAILED DESCRIPTION OF THE PREFERRED EMBODIMENT

Figure 1A:
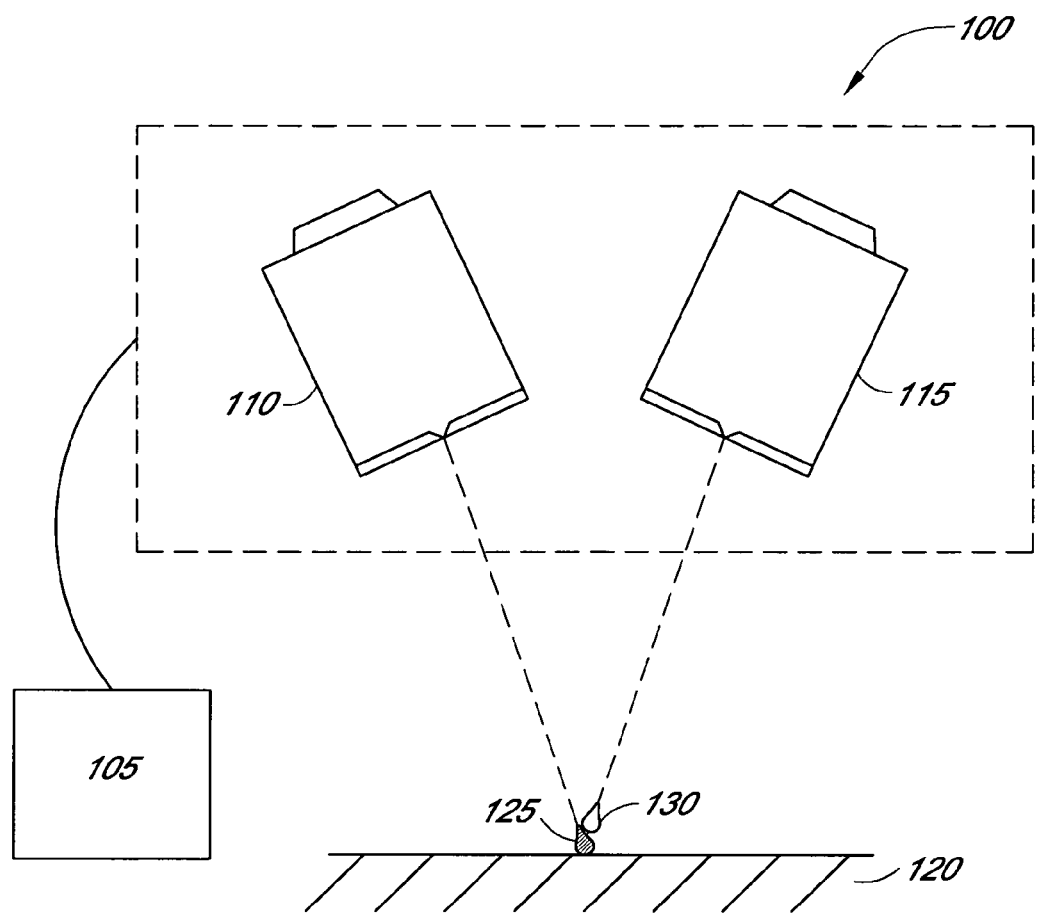
FIGS. 1A–1C schematically illustrate a plurality of spray heads projecting polymer droplets onto nearly the same location on a substrate in various proportions to form adjoining polymer pixels.

Preferred embodiments are directed to methods and systems for making optical elements. Preferred optical elements comprise a continuous film containing a relatively large number of relatively small polymer "pixels." The individual polymer pixels are the basic building blocks of the preferred optical element and are loosely analogous to the traditional pixels that are the basic building blocks of an image on a television screen. The polymer pixels are preferably arranged within the optical element is such a way that an eye or observing instrument perceives continuity, similar to the way that an image on a television screen appears to be continuous. For example, the polymer pixels in an optical element such as an eyeglass lens are preferably so small and close together that the unaided human eye does not readily perceive that the focusing effect produced by the lens is due to the individual pixels. Preferably, the polymers pixels are contiguously adjoined to one another at their edges to form a continuous film (see FIG. 9, discussed below). The optical properties of an individual polymer pixel are preferably relatively constant throughout the pixel (except near boundaries where mixing may occur when a pixel adjoins another pixel having a different optical property). The optical properties of the optical element can be varied from point to point throughout the optical element by controlling the optical properties of the individual polymer pixels making up the optical element.

In preferred embodiments, control over the optical properties of the individual polymer pixels is exercised by precisely depositing selected amounts of two or more polymer compositions, each having a different individual optical property, onto a substrate in the form of polymer pixels, such that the desired optical property is produced at any particular pixel in the resulting optical element by averaging the individual optical properties of the materials comprising each polymer pixel. This "averaging" may result when the constituents of the two or more polymer compositions mix together to form a single pixel. Averaging of an optical effect may also be produced when the constituents of the two polymer compositions remain separated after deposition on the substrate surface, but are so small and close together that an eye or observing instrument perceives them to be a single pixel.

Polymer pixels are preferably deposited using a Polymer Projection Deposition System (PPDS) that rapidly projects a large number of very small polymer droplets at precisely controlled pre-selected locations on a substrate. Micro-jet polymer printing methods generally known to those skilled in the art are examples of PPDS's when used as described herein. PPDS's are described in U.S. Pat. Nos. 5,235,352, 5,498,444 and 5,707,684, all of which are hereby incorporated by reference in their entireties and particularly for the purpose of describing PPDS's. PPDS's are commercially available from MicroFab Technologies, Inc., Plano, Tex. A preferred PPDS comprises a computerized control unit that controls the projecting of a first polymer composition and a second polymer composition onto pre-selected locations on a substrate, in a plurality of pre-selected ratios of the first polymer composition to the second polymer composition.

Many properties of the resulting optical element can be controlled by depositing polymers onto a substrate as described herein, including mechanical, physical, chemical and optical properties. Preferably, optical properties are controlled, including without limitation index of refraction, polarizability, Verdet constant, Kerr constant, electro-optical constant, birefringence, and absorption. More preferably, an optical property is controlled in a point-to-point manner throughout the film to provide a non-monotonic profile in the property, as measured radially and/or angularly (in circular coordinates). For example, a preferred film has a radially non-monotonic refractive index profile and an angularly non-monotonic refractive index profile. In a preferred embodiment, the optical element is a lens that comprises a continuous polymer film having a radially non-monotonic refractive index profile and/or an angularly non-monotonic refractive index profile.

Preferred methods for making optical elements involve the projection of two or more polymer compositions onto pre-selected locations on a substrate. The term "polymer composition," as used herein, is a broad term that refers to a composition that comprises a polymer. The term "polymer" includes all forms of polymer and their precursors, including without limitation pre-polymers, polymer solutions, polymer emulsions, polymer microemulsions, solid polymers, polymer melts, and/or mixtures thereof. For example, a polymer composition comprising liquid pre-polymers may be projected by a PPDS onto a substrate, then cured (e.g., by heat or irradiation) to form solid polymer pixels. The wavelength of irradiation used to cure the pre-polymer may vary over a broad range, e.g., x-ray, ultraviolet (UV) visible, infrared, microwave, millimeter wave, etc. The irradiation may comprise particle radiation, e.g., particle beam, electron beam and/or ion beam. Preferred pre-polymers are UV-curable. A polymer composition comprising a solvent may likewise be projected onto a substrate, and the solvent evaporated to form solid polymer pixels. A polymer composition comprising solid particulate polymers may be projected onto a substrate, then heated to form solid polymer pixels. A polymer composition comprising a molten polymer can be projected onto a substrate, then cooled to form solid polymer pixels. Polymer emulsions or microemulsions are polymer compositions that may be projected onto a substrate, and the carrier liquid evaporated to form solid polymer pixels. For embodiments in which two or more high molecular weight polymers are projected, the individual polymers preferably form mutually miscible blends in all proportions. Preferably, there are relatively large differences in the indices of refraction between each of the individual polymers.

Optical elements and the polymer compositions used to form them can include a wide variety of polymer types. Non-limiting examples of polymer types include poly(acrylate), poly(methylmethacrylate), poly(vinylidene chloride), polycarbonate, poly(vinyl butyral), poly(ethylene), ethylene/1-alkene copolymer, poly(ethylene terephthalate), poly(acrylonitrile), poly(butadiene), polystyrene, acrylonitrile-butadiene-styrene (ABS) terpolymers, allyl diglycol carbonate polymer, poly(methyl pentene), polyamide (e.g., nylon), poly(2,6-dimethyl-1,4-phenyleneoxide), poly(vinyl methyl ether), epoxy polymer, thiol-ene polymer, silicone polymer, and blends, mixtures, copolymers, and pre-polymers thereof. Pre-polymers are preferred. Polymers containing aromatic compounds or nitrogen atoms, and/or atoms of high atomic weight such as sulfur, bromine or metals generally have a higher index of refraction. Non-aromatic polymers devoid of atoms with high atomic weight and fluoropolymers generally have lower indices of refraction. High refractive index polymers can be dissolved in monomers to obtain a high index polymer composition.

Polymer compositions may comprise one or more additives incorporated for various reasons, e.g., to affect the properties of the resulting polymer pixels and/or to facilitate the fabrication process. Non-limiting examples of such materials include surfactants, viscosity modifiers, colorants, pH adjusters, fillers, low-index particles, high-index particles, and metals. Preferred polymer compositions have a solution viscosity in the range of about 1 centipoise (cP) to about 2000 cP, preferably about 1 cP to about 80 cP, as measured at the temperature and shear rate used to project the composition onto the substrate. High-index particles and metals are preferred additives for optical applications. High-index particles, including metals, metal oxides and metal fluorides, are preferably incorporated into the polymer composition in an amount that increases the refractive index of the resulting polymer pixel by about 0.001 or more. Preferred high index particles are nanoparticles having a size that does not scatter the wavelength of interest when incorporated into the optical element. Preferred nanoparticles have a refractive index that is higher than the polymer contained in the polymer pixel into which the nanoparticles are incorporated, more preferably a refractive index of about 1.6 or higher. Preferred nanoparticles comprise a polymer, a metal, and/or metal oxide, more preferably titanium dioxide ($TiO_2$) and/or lanthanum oxide ($La_2O_3$). Nanoparticles can be incorporated into polymer compositions in a variety of ways, preferably by dispersing them in the polymer composition using a surface active agent. Metals can be incorporated into polymer compositions in the form of nanoparticles or in other ways. For example, organometallic compounds containing the metal of interest can be dissolved or dispersed in a polymer composition. An example of a stable organo-metallic compound for such use is titanium tetraisopropoxide, see U.S. Pat. No. 6,394,613. Other organometallic compounds include triphenyl bismuth and various organotin compounds.

Preferably, at least a portion of the solid polymer pixels in the continuous polymer film each comprise a first material and a second material, the first material being different from the second material in an optical property. For example, the first material in a particular polymer pixel may be a polymer and the second material in that pixel may be a different polymer, a metal, and/or a nanoparticle, the different polymer, metal, and/or nanoparticle having refractive index that is different from the refractive index of the first polymer. Preferably, the first and second materials in the polymer pixel form a polymer/polymer, polymer/metal or polymer/nanoparticle mixture. The term "polymer/polymer" refers to a mixture containing two or more polymer types, preferably as described above. The term "polymer/metal" refers to a mixture containing a least one polymer and at least one metal. The metal may be dissolved in the polymer and/or dispersed in the polymer, e.g., dispersed in the form of a nanoparticle, preferably as described above. The term "polymer/nanoparticle" refers to a mixture containing a least one polymer and at least one type of nanoparticle, preferably a dispersed nanoparticle as described above.

Polymer compositions may be deposited onto a broad variety of substrates. Preferred substrates include glass, polymer, metal, ceramic, crystal, paper, and semiconductor surfaces. In one embodiment, the optical element is a continuous free-standing film that is removed from the substrate after fabrication. For this embodiment, the substrate preferably has non-stick surface to minimize adhesion to the film, permitting the film to be easily peeled from the substrate after it is made. In another embodiment, the substrate is substantially transparent. Those skilled in the art will understand that the term "substantially transparent" means that the substrate is sufficiently transparent for its intended use. For example, lens blanks used for making eyeglasses are preferred examples of substantially transparent substrates. Such substrates are considered substantially transparent even if their optical transparency is reduced by tinting or coating to produce, e.g., sunglasses, because after such tinting or coating the substrate remains sufficiently transparent for its intended use. Lens blanks include plano blanks (having no corrective power) as well as lenses having various degrees of corrective power. A preferred lens blank is selected from the group consisting of a plano blank, an optical blank with positive focusing power, an optical blank with negative focusing power, an optical blank with focusing power and cylindrical power, and an optical blank with progressive addition lens (PAL) power. In a preferred embodiment, the substantially transparent substrate and the continuous film together comprise a lens. Other preferred substrates include the optics of viewing instruments such as telescopes, microscopes, cameras, binoculars, and ophthalmic diagnostic instruments such as confocal scanning ophthalmoscopes, as well as other instruments that contain precision optical elements such as refractive elements (e.g., lenses), reflective elements (e.g., mirrors and beam splitters), and/or diffractive elements (e.g., gratings and acousto- and electro-optical crystals).

The polymer pixels in the optical element are preferably "solid," meaning that they are substantially free of uncured or partially cured polymer. Wavefront aberrators having a variable index of refraction have been prepared by selective curing of a polymer, see U.S. Patent Application Publication No. 2002/0080464 A1, but contain non-solid areas in which the polymer is not completely cured. It has been found that the presence of significant amounts of uncured or partially cured polymer in the polymer pixels can result in stability problems if the extent of cure changes over time and affects the optical properties of the optical element. Solid polymer pixels may be flexible or rigid, and thus the continuous film comprising the polymer pixels may also be flexible or rigid, depending on factors such as the thickness of the film and the type of polymer. The solid polymer pixels may be deposited on the continuous film or the continuous film may consist essentially of contiguous adjoining polymer pixels. The continuous film may comprise a plurality of layers, preferably with each layer comprising solid polymer pixels, or may be a layer within another structure. Continuous films may contain gaps, holes or apertures as desired, e.g., to form an optical element having a particular configuration. Continuous films comprise a plurality of polymer pixels, preferably at least about 50 adjoining polymer pixels, more preferably at least about 1000 adjoining polymer pixels. The average size of the polymer pixels is preferably about 200 microns or less, more preferably in the range of about 0.1 micron to about 200 microns, even more preferably in the range of about 0.1 micron to about 10 microns, most preferably in the range of about 0.1 micron to about 1 micron. For non-symmetrical polymer pixels, size is measured along the longest dimension. In a preferred embodiment, the average size of the pixels is below the size at which the pixels scatter the radiation of interest. For visible light, the average size of the pixels is preferably about 0.4 micron or less, more preferably about 0.3 micron or less.

Preferably, the properties of any particular solid polymer pixel are controlled by mixing two or more polymer compositions to thereby average the corresponding properties of the constituents of each polymer composition. The proportions of each individual polymer composition deposited at any given location on the substrate may be varied from 0% to 100%, by weight based on total weight. Various methods may be used to control the proportions of the individual polymer compositions deposited. A preferred method for making an optical element comprises forming a first polymer pixel on a substrate, the first polymer pixel comprising a first polymer composition and a second polymer composition in a first ratio; (b) forming a second polymer pixel adjoining the first polymer pixel, the second polymer pixel comprising the first polymer composition and the second polymer composition in a ratio that is different from the first ratio; and (c) repeating steps (a) and (b) to thereby form a continuous film comprising a plurality of adjoining polymer pixels.

For example, FIG. 1A illustrates a preferred embodiment in which two polymer compositions are projected onto a substrate using a spray unit 100 that is controlled by a computerized controller 105, the spray unit 100 comprising a first spray head 110 and a second spray head 115. In this embodiment, the first spray head 110 contains or is charged with a first polymer composition comprising a high refractive index polymer, and the second spray head 115 contains or is charged with a second polymer composition containing a low refractive index polymer. The spray heads 110 and 115 are positioned an operative distance from a substrate 120. Deposition is conducted by projecting a first polymer droplet from the first spray head 110 onto a pre-selected location on the substrate 120 to form a first deposited polymer droplet 125, the first polymer droplet containing a first amount of the first polymer composition. Deposition is further conducted by projecting a second polymer droplet 130 from the second spray head 115 in close proximity to the first deposited polymer droplet 125, the second polymer droplet containing a second amount of the second polymer composition.

Figure 1B:
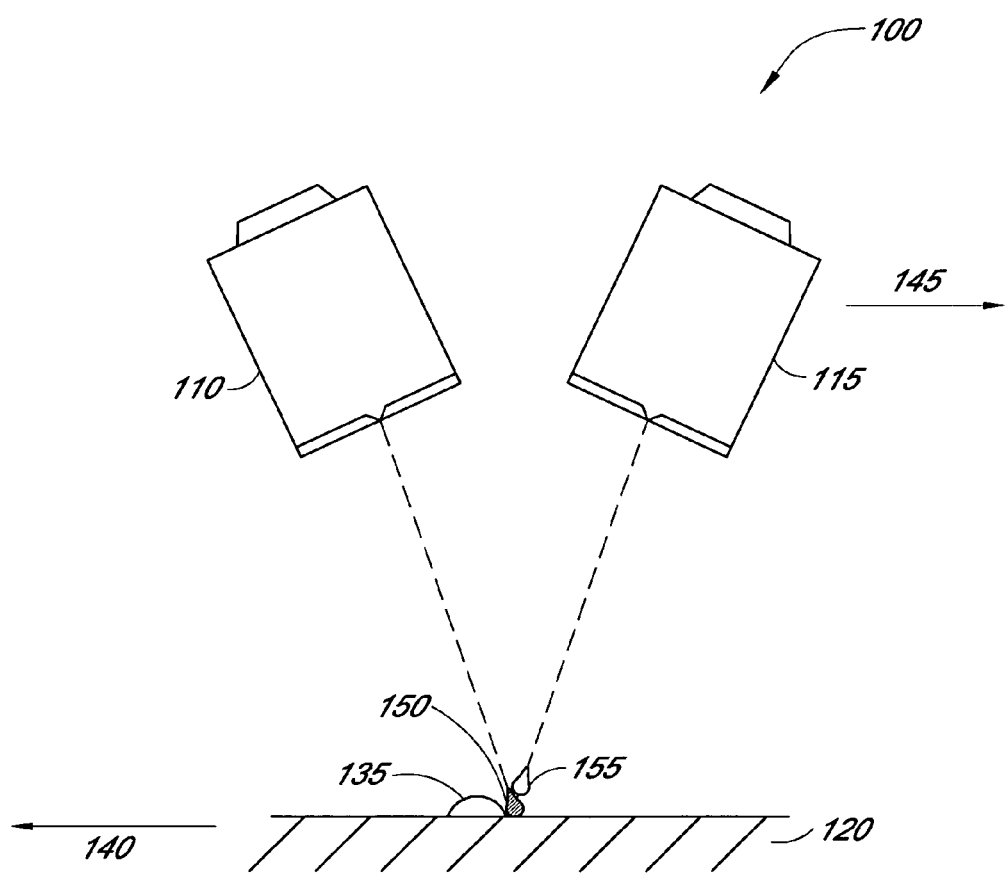
Figure 1C:
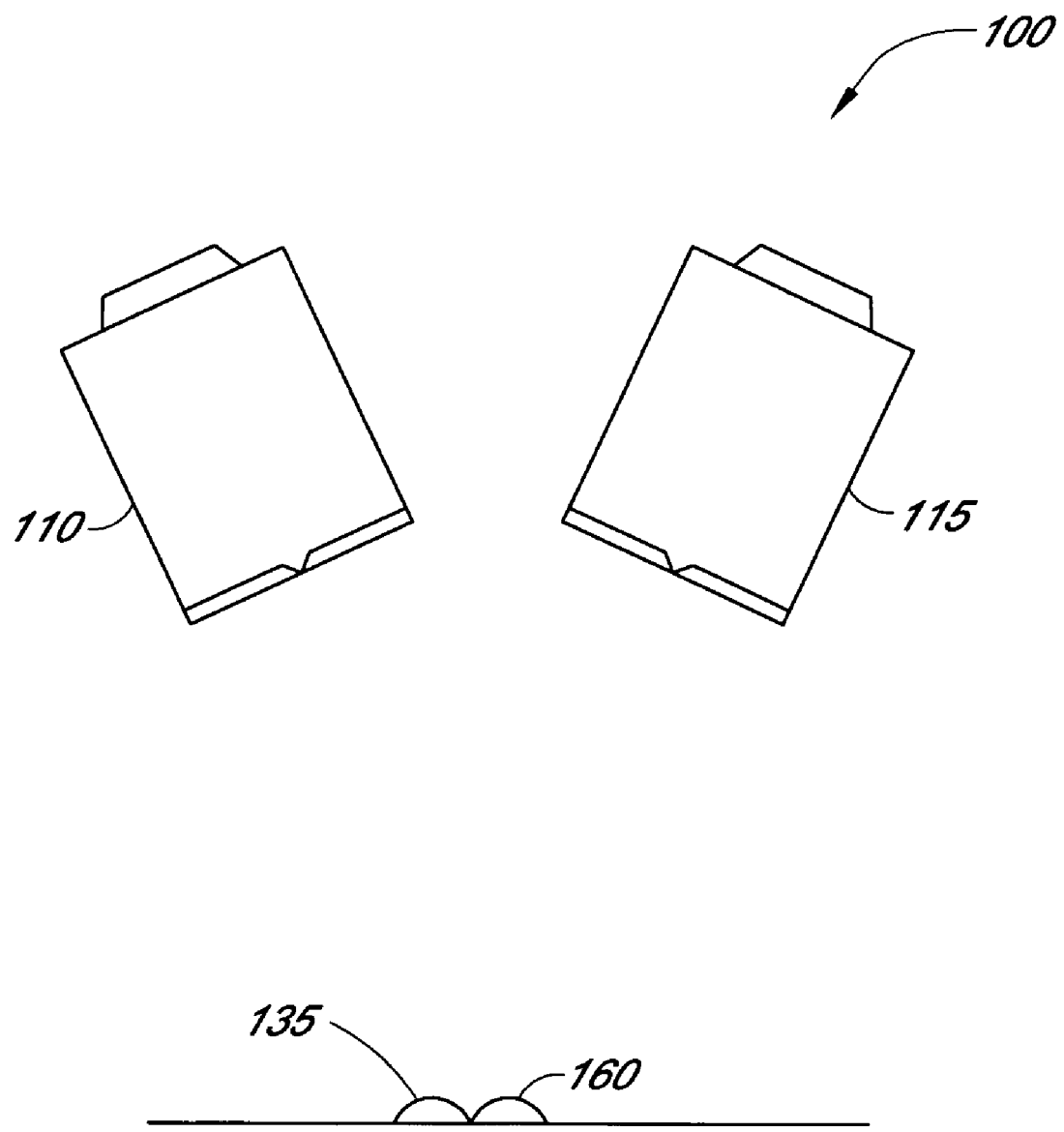

The deposition process continues as illustrated in FIG. 1B by forming a first polymer pixel 135 by mixing the first deposited polymer droplet 125 and the second polymer droplet 130. The first polymer pixel 135 comprises the first polymer composition and the second polymer composition in a first ratio. At least one of the first and second spray heads 110 and 115 is then adjusted to allow an additional droplet to be projected, the additional droplet being different from at least one of the first and second droplets 125 and 130. In the illustrated embodiment, first and second spray heads 110 and 115 are each adjusted to alter the relative amounts of the first and second polymer compositions, respectively, to be projected. This may be accomplished in various ways, e.g., by adjusting the compositions and/or the sizes of the droplets, see FIG. 6 (discussed below), and/or the number of droplets (also discussed below). In FIG. 1B, the positioning of the first and second spray head heads 110 and 115 with respect to the substrate 120 is also adjusted, e.g., by moving the substrate laterally as indicated by the first arrow 140, and/or by moving the spray unit laterally as indicated by the second arrow 145, and/or by pivoting the spray heads 110 and 115 (not shown), etc. These adjustments to the spray heads and their positions relative to the substrate can by conducted in any order, for example, the first spray head 110 may be adjusted before the second spray head 115, or vice versa, or the spray heads may be adjusted simultaneously, and are preferably controlled by the computerized controller 105. The deposition process is then repeated as illustrated in FIG. 1B by projecting new first and second polymer droplets 150 and 155 from spray heads 110 and 115 to thereby form a second polymer pixel 160 adjoining the first polymer pixel 135 as shown in FIG. 1C, the second polymer pixel comprises the first polymer composition and the second polymer composition in a second ratio, different from the first ratio. A continuous film comprising a plurality of adjoining polymer pixels may then be formed by repeating the deposition process in a like manner, preferably by adjusting the spray heads and their positions to the extent and in the manner needed to form a continuous film having the desired properties. The polymer compositions may be heated or cooled by, e.g. heating or cooling the first and second spray heads 110 and 115 as desired, e.g., to adjust the viscosities of the polymer compositions. It is understood that the ratio of first polymer to second polymer in one polymer pixel can be the same as in an adjoining polymer pixel, and thus the first and second spray heads 110 and 115 do not always need to be adjusted to alter the relative amounts of the first and second polymer compositions, respectively, to be projected.

For the embodiment illustrated in FIG. 1, the forming of the polymer pixels preferably takes place by at least partially intermixing the contents of projected droplets on the surface of the substrate. Preferably, at least about 50%, more preferably at least about 75%, of the adjoining solid polymer pixels in a continuous film comprise a mixture of a first polymer and a second polymer, as determined at the center of the polymer pixel. Those skilled in the art will appreciate that such mixing need not take place prior to the deposition of the next droplet, and thus may take place after a number of droplets have been deposited on the substrate, e.g., as illustrated in FIG. 6 (discussed below). It will also be appreciated that a pixel may contain only one polymer composition (excluding boundary effects with other pixels, where edge mixing may occur), e.g., a pixel formed from only one polymer droplet, or that a pixel may be formed from many polymer droplets, depending on the size desired for the pixel. Thus, in a preferred embodiment, the composition of a pixel formed from many polymer droplets is controlled by adjusting the first and second spray heads 110 and 115 to control the relative number of droplets projected from each spray head onto the substrate location at which the polymer pixel is formed.

Figure 2A:
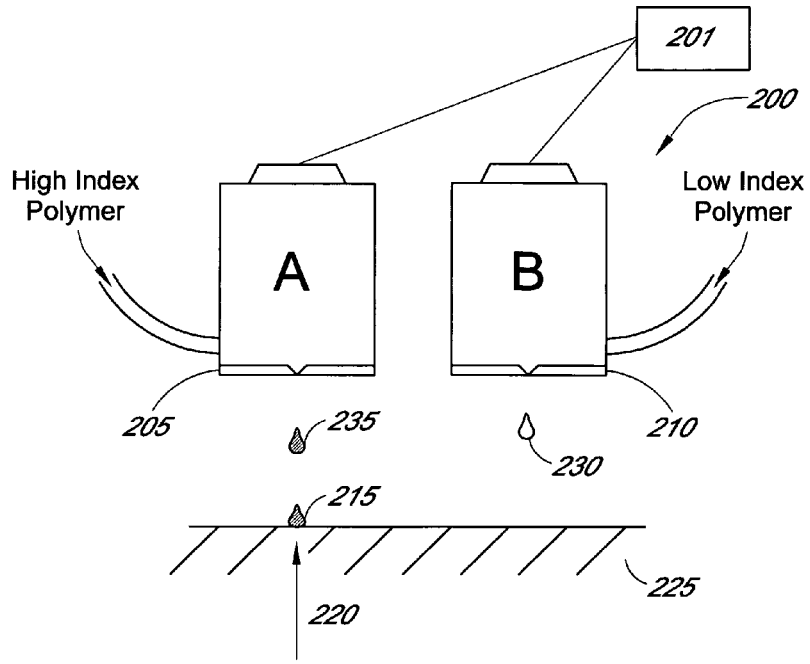
FIGS. 2A–2B schematically illustrate a plurality of spray heads projecting polymer compositions onto a substrate.
Figure 2B:
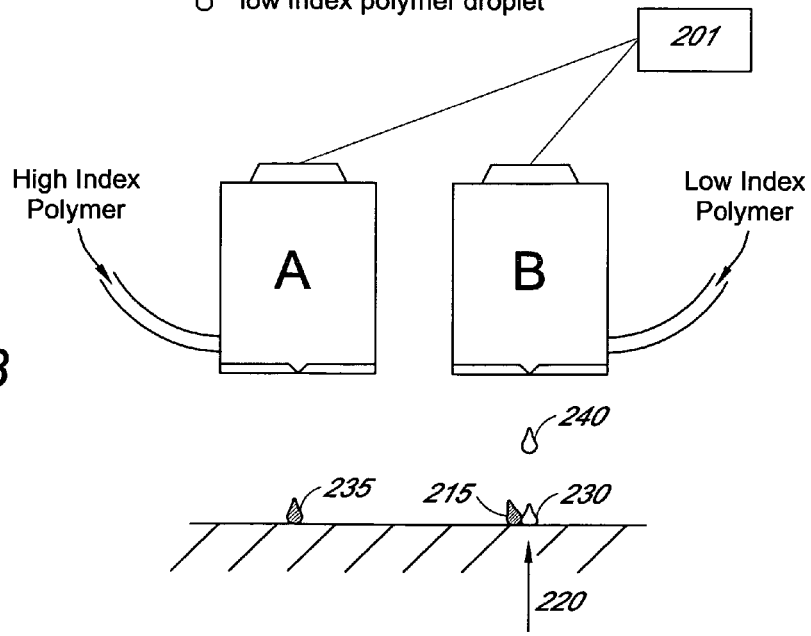

In the embodiment illustrated in FIG. 1, both of the spray heads 110 and 115 project the polymer droplets to nearly the same point on the substrate. The first and second polymer droplets may be projected sequentially (with or without a lapse of time between projection) or simultaneously. For example, in the embodiment illustrated in FIG. 2 (not to scale), spray unit 200 is controlled by computerized controller 201 and comprises spray heads 205 and 210. A first deposited polymer droplet 215 is projected by spray head 205 onto a location 220 on the substrate 225 as shown in FIG. 2A. The spray unit 200 and/or the substrate 225 moves laterally so that a second polymer droplet 230 projected from spray head 210 onto the substrate 225 is deposited in close proximity to the first polymer droplet 215 as shown in FIG. 2B. After deposition, the first and second polymer droplets 215 and 230 are free to intermix to form a polymer pixel, preferably a solid polymer pixel having a refractive index that is a weighted average of the refractive indices of the polymer compositions contained in each of the first and second polymer droplets 215 and 230. As indicated in FIG. 2B, the deposition process continues in a similar manner by projecting new first and second polymer droplets 235 and 240 from the first and second spray heads 205 and 210, respectively. In the illustrated embodiment, the polymer droplets projected by the first spray head 205 comprise a high refractive index polymer, and the polymer droplets projected by the second spray head 210 comprise a low refractive index polymer. The properties of adjoining polymer pixels can be made to differ by, e.g., adjusting the first and second spray heads 205 and 210 to vary the size of the projected droplets and/or the relative amounts of the high refractive index polymer and low refractive index polymer, respectively, contained within the projected polymer droplets. The properties of adjoining polymer pixels can also be made to differ by controlling the relative number of droplets deposited by each spray head. The polymer compositions may be heated or cooled prior to projection by, e.g., heating or cooling the first and second spray heads 205 and 210 as desired, e.g., to adjust the viscosities of the polymer compositions. The embodiments illustrated in FIGS. 1 and 2 may comprise additional spray heads for projecting additional polymer compositions in a similar manner.

It is apparent from the foregoing that the spray heads may be adjusted to alter the droplet size and/or relative amounts of constituents in the polymer compositions contained in the droplets. Thus, those skilled in the art will appreciate from the foregoing that deposition may also be conducted using a single spray head by repeatedly adjusting the spray head to alter the relative proportions of the polymer compositions charged to the spray head. Such a method may be conducted, for example, as generally described above by using only one of the spray heads illustrated in FIG. 1 or 2. A preferred method comprises positioning a spray head an operative distance from a substrate; charging the spray head with a first polymer composition; projecting a first polymer droplet from the spray head onto the substrate to form a first polymer pixel on the substrate; charging the spray head with a second polymer composition different from the first polymer composition; adjusting the positioning of the spray head with respect to the substrate; and projecting a second polymer droplet from the spray head onto the substrate to form a second polymer pixel adjoining the first polymer pixel. A continuous film comprising a plurality of adjoining polymer pixels may be formed by repeating these steps. Each polymer droplet may result in a separate polymer pixel, or a polymer pixel may be formed from a plurality of droplets deposited in close proximity on the substrate.

Those skilled in the art will appreciate that multiple spray heads or spray units may be used in the PPDS's described herein, and that any or all of the various functions of the PPDS are preferably controlled by a computerized controller. Preferably, the controller is programmed by inputting a desired optical property profile, and controls the amount and type of each polymer deposited at each location on the substrate to produce, e.g., an optical element having a desired refractive index profile.

Additional steps may be carried out to facilitate the forming of the solid polymer pixels. Preferably, polymer pixels are formed by localized mutual diffusion between deposited polymer droplets containing different constituents. Such diffusion is preferably facilitated by heating, e.g., by heating the substrate. Heating and/or reduced pressure may also be used to evaporate any solvent present in the deposited polymer pixels to form solid polymer pixels. Heating may also be used to cure a pre-polymer to form solid polymer pixels. Pre-polymers may also be cured by other methods known to those of skill in the art, depending on the specific pre-polymer, e.g., by irradiation, preferably by ultraviolet light or electron beam.

Figure 3:
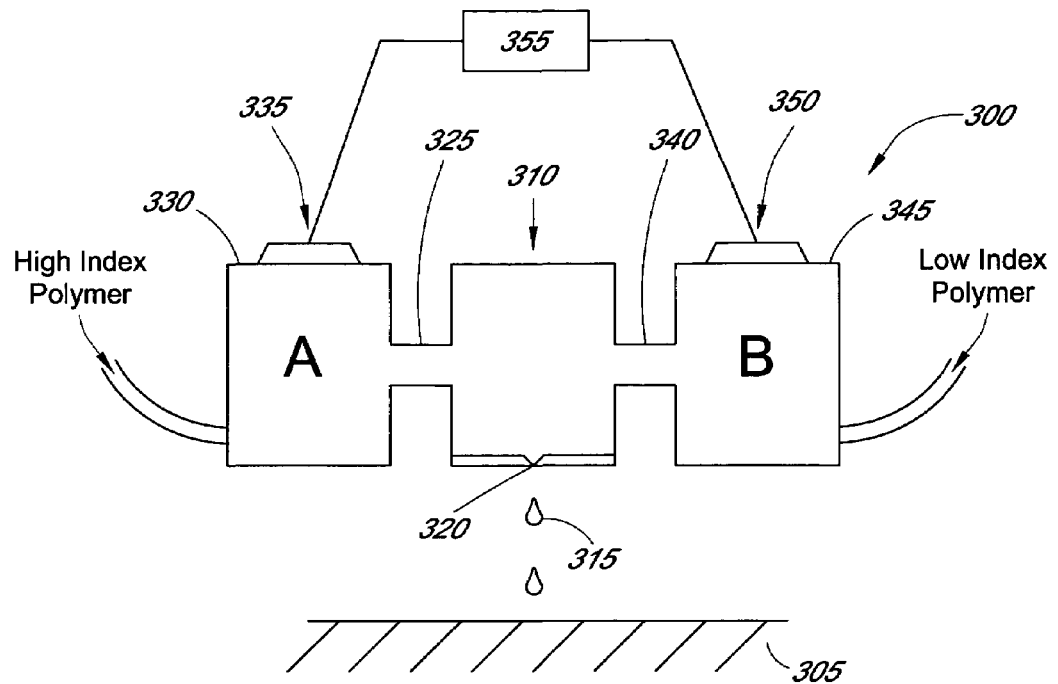
FIG. 3 is a schematic drawing showing a preferred pre-mix spray head for projecting polymer compositions onto a substrate in various proportions.

Intermixing of the polymer compositions may also take place prior to projecting. For example, FIG. 3 illustrates a preferred embodiment in which two polymer compositions are pre-mixed in a spray head 300, then projected onto a substrate 305. Deposition may continue in the general manner discussed above to form adjoining solid polymer pixels. The proportions of the constituents in each of the resulting polymer pixels can be controlled in various ways. For example, in the embodiment shown in FIG. 3, a spray head 300 comprises a mixing chamber 310 to contain a polymer droplet 315, the chamber having an orifice 320 sized to permit the polymer droplet 315 to be expelled from the chamber. Preferably, the volume of the polymer droplet 315 is in the range of about 10 picoliters to about 10 microliters. The spray head 300 also has a first inlet 325 connecting the mixing chamber 310 to a first reservoir 330, the first inlet 325 being sized to permit passage of a first solvent or first polymer composition into the mixing chamber 310 from the first reservoir 330. The spray head 300 also has a first actuator 335 operatively disposed to expel a pre-selected quantity of the first solvent or first polymer composition from the first reservoir 330 into the mixing chamber 310 and, optionally, out of the orifice 320 as a first constituent of the polymer droplet 315. The spray head 300 also has a second inlet 340 connecting the mixing chamber 310 to a second reservoir 345, the second inlet 340 being sized to permit passage of a second solvent or second polymer composition into the mixing chamber 310 from the second reservoir 345. The spray head 300 also has a second actuator 350 operatively disposed to expel a pre-selected quantity of the second solvent or second polymer composition from the second reservoir 345 into the mixing chamber 310 and, optionally, out of the orifice 320 as a second constituent of the polymer droplet 315.

Each of the first and second actuators 330 and 345 is capable of generating a full polymer droplet or a fraction of a polymer droplet and controls the flow of each polymer composition from each of the respective reservoirs 330 and 345 into the mixing chamber 310. In the illustrated embodiment, the first polymer composition in the first reservoir 330 contains a high refractive index polymer and the second polymer composition in the second reservoir 345 contains a low refractive index polymer. The composition of the polymer droplet 315 can be varied from droplet to droplet, as the first and second actuators 335 and 350 controlling the flow of the polymer compositions into the mixing chamber each provide fractions of a droplet through the first and second inlets 325 and 340, respectively, the fractions preferably adding to one. Preferably, the first and/or the second actuators 335 and 350 are controlled by a computerized controller 355, thereby enabling the computer to control the quantity of first solvent or first polymer and/or second solvent or second polymer entering the mixing chamber 310. The first and second actuators 335 and 350 may be operated to project the polymer droplet from the mixing chamber 310, or the mixing chamber may be equipped with a third actuator (not shown) for this purpose. Those skilled in the art will appreciate that additional reservoirs containing additional polymer compositions may be attached to the mixing chamber 310 by additional inlets. All or part of the spray head 300 may be heated or cooled as desired, e.g., to adjust the viscosities of the polymer compositions.

Figure 4:
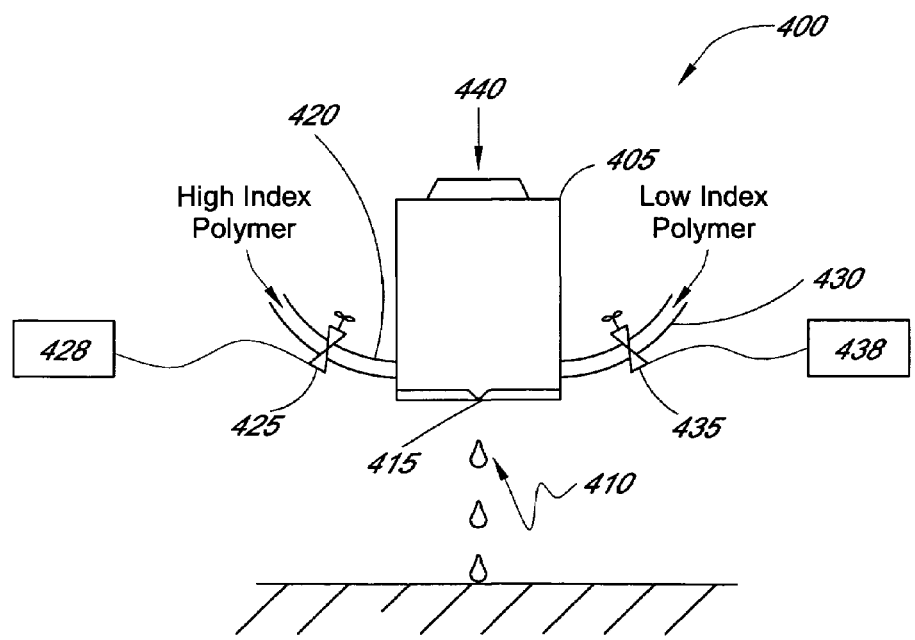
FIG. 4 is a schematic drawing showing a preferred pre-mix spray head having valves for controlling the pre-mix of polymer compositions.

Another method for intermixing two or more polymer compositions prior to projecting is illustrated in FIG. 4 (not to scale). A spray head 400 comprises a chamber 405 to contain a polymer droplet 410, the chamber 405 comprising an orifice 415 sized to permit the polymer droplet 410 to be expelled from the chamber. Preferably, the volume of the polymer droplet 410 is in the range of about 10 picoliters to about 10 microliters. The spray head 400 further comprises a first inlet 420 attached to the chamber 405 and sized to permit passage of a first solvent or a first polymer composition into the chamber 405 from a suitable reservoir (not shown). The first inlet 420 is equipped with a first valve 425, preferably computer controlled by controller 428, the first valve 425 being adjustable to allow a pre-selected quantity of the first solvent or the first polymer composition to enter the chamber 405 from the inlet 420. The spray head 400 also comprises a second inlet 430 attached to the chamber 405 and sized to permit passage of a second solvent or a second polymer composition into the chamber 405. The second inlet 430 is equipped with a second valve 435, preferably computer controlled (either by a controller 428 or by a different controller 438 as shown), the second valve 435 being adjustable to allow a pre-selected quantity of the second solvent or the second polymer composition to enter the chamber 405 from the inlet 430. The spray head 400 also comprises an actuator 440 operatively disposed to expel the polymer droplet 410 from the chamber 405 through the orifice 415. Preferably, the actuator also draws the first and second polymer compositions into the chamber 405. Preferably, the spray head 400 also comprises means for pressurizing the fluid first polymer composition and/or the second polymer composition such as a pump or pumps (not shown) attached to the inlets 420, 430 and/or respective polymer reservoirs. The spray head 400 also preferably comprises means for drawing the fluid first polymer composition and/or the second polymer composition into the chamber such as the actuator 440 or a pump attached to the chamber 405.

In the embodiment illustrated in FIG. 4, the first polymer composition comprises a high refractive index polymer and the second polymer composition comprises a low refractive index polymer. In operation, the flow of the polymer compositions into the chamber 405 is controlled by the first and second valves 425 and 435, which are preferably electromechanically activated and controlled by a computer. Liquid volume and/or flow monitoring devices can also be included (not shown). The chamber 405 preferably has a small volume, so that the composition of the projected polymer droplets can be rapidly altered. All or part of the spray head 400 may be heated or cooled as desired, e.g., to adjust the viscosities of the polymer compositions. The spray heads illustrated in FIGS. 3 and 4 are examples of the spray heads that can be used in the methods illustrated in FIGS. 1 and 2. Preferably, a computerized controller is used to control the PPDS's, including the spray units and spray heads described herein. Although the difference in refractive index in the first and second polymer compositions in the illustrated embodiment is controlled by using polymers having different refractive indices, those skilled in the art will understand that the difference in refractive index can be achieved in other ways. For example, the first and second polymer compositions may contain the same polymer, but different amounts or types of a metal or a high-index nanoparticle.

Figure 5:
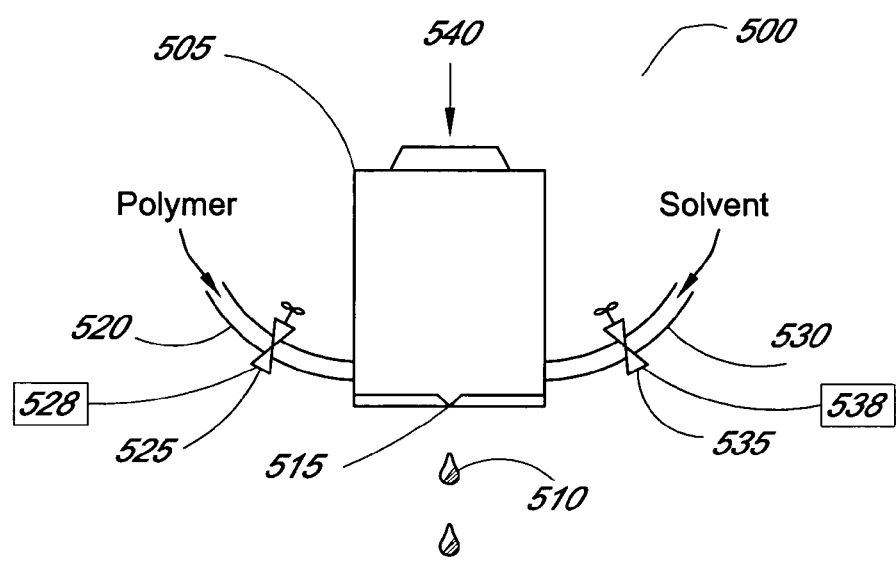
FIG. 5 is a schematic drawing showing a preferred pre-mix spray head having valves for controlling the composition of a polymer/solvent pre-mix.

As discussed above, the polymer compositions may comprise a solvent. Preferred solvents reduce the viscosity of the polymer composition into a range that is suitable for projecting by the methods described herein. Solvents for various polymers are know to those skilled in the art, and are preferably selected on the basis of factors such as performance, cost, toxicity, and/or environmental acceptance. A spray head may be adjusted to introduce varying quantities of solvent into a polymer composition, thus varying the amount of polymer contained in the resulting projected polymer droplet. For example, FIG. 5 illustrates a spray head 500 generally similar to the spray head 400 illustrated in FIG. 4, except that a solvent is introduced into chamber 505 by way of a second inlet 530 and a second valve 535. The spray head 500 illustrated in FIG. 5 comprises a chamber 505 to contain a polymer droplet 510, the chamber 505 comprising an orifice 515 sized to permit the polymer droplet 510 to be expelled from the chamber. Preferably, the volume of the polymer droplet 510 is in the range of about 10 picoliters to about 10 microliters. The spray head 500 further comprises a first inlet 520 attached to the chamber 505 and sized to permit passage of a first polymer composition into the chamber 505 from a suitable reservoir (not shown). The first inlet 520 is equipped with a first valve 525, preferably computer controlled by a controller 528, the first valve 525 being adjustable to allow a pre-selected quantity of the first polymer composition to enter the chamber 505 from the inlet 520. The spray head 500 also comprises a second inlet 530 attached to the chamber 505 and sized to permit passage of a solvent into the chamber 505. The second inlet 530 is equipped with a second valve 535, preferably computer controlled (either by the controller 528 or by a different controller 538 as shown), the second valve 535 being adjustable to allow a pre-selected quantity of the solvent to enter the chamber 505 from the inlet 530. The spray head 500 also comprises an actuator 540 operatively disposed to expel the polymer droplet 510 from the chamber 505 through the orifice 515. Preferably, the actuator also draws the first polymer composition and solvent into the chamber 505. Preferably, the spray head 500 also comprises means for pressurizing the fluid first polymer composition and/or the solvent such as a pump or pumps (not shown) attached to the inlets 520, 530 or the respective reservoirs. The spray head 500 also preferably comprises means for drawing the fluid first polymer composition or the solvent into the chamber such as the actuator 540 or a pump attached to the chamber 505.

The amount of polymer composition in each projected droplet 510 may thus be controlled on a droplet-by-droplet basis by varying the relative ratio of the polymer composition and the solvent. The amount of polymer composition in the droplet can vary from 0 to 100% by volume. Preferably, the solvent is present in an amount effective to adjust at least one property selected from the group consisting of first polymer composition viscosity, second polymer composition viscosity, and volume ratio of the first polymer composition to the second polymer composition. Practice of this embodiment allows the composition and viscosity of the droplet to be modified by the solvent, preferably while maintaining a relatively constant droplet size. Those skilled in the art will appreciate that any of the spray heads described herein may be adjusted in a like manner to vary the composition and/or size of the resulting projected polymer droplet.

Figure 6A:
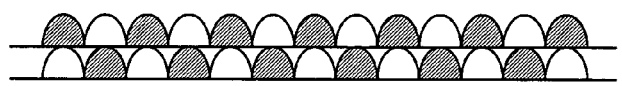
FIGS. 6A–6B are schematic drawings illustrating methods of controlling refractive index by controlling the relative sizes of the deposited polymer droplets.
Figure 6B:

The properties of the continuous film can be controlled on a pixel-by-pixel basis in three dimensions by depositing one or more layers of polymer droplets. For example, FIG. 6 schematically illustrates layers comprising deposited polymer droplets. In the illustrated embodiments, a high refractive index polymer is represented by the filled semi-circles and a low index polymer is represented by the open semi-circles. For simplicity of illustration, only two types of deposited polymer droplets are shown, without any mixing or interdiffusion, but it will be appreciated that other types of polymer droplets may be deposited and that localized mixing may occur. In FIG. 6A, all of the deposited polymer droplet are approximately the same size and there are an equal number of high and low index droplets. After mixing (not shown), the illustrated droplets will form a polymer pixel having a refractive index about midway between the refractive indices of the individual polymer pixels. In FIG. 6B, there are an equal number of high and low index droplets, but the high index droplets are about ⅓ the size of the low index droplets. After mixing (not shown), the resulting polymer pixel will have an index of refraction that is lower than in FIG. 6A because of the higher proportion of low index polymer contained in the deposited polymer droplets. Deposition of the droplets shown in FIG. 6B on a substrate in close proximity to the droplets shown in FIG. 6A will, after localized mixing, result in adjoining polymer pixels in which the refractive index varies from one pixel to the other.

The methods described above provide exceptional control over the refractive index of the resulting optical element as a function of position. By controlling the proportions of the various constituents (and thus the refractive index) in each pixel, the number of pixels deposited on the substrate, and the position of each pixel, a continuous film having a non-monotonic profile in an optical property can be formed. Optical elements having a radially monotonic profile in an optical property, typically refractive index, have been disclosed, see U.S. Pat. No. 6,089,711 and H. J. Trost, "Using Drop-On_Demand Technology for Manufacturing GRIN Lenses," Proc. 2001 Ann. Mtg. ASPE, 10–15 November 2001 (ASPE Raleigh N.C. 2001), pp. 533–536. The refractive index profile in such optical elements rises or falls steadily along a radius from a central point, without reversals or oscillations. In this context, those skilled in the art will understand that an optical element having a "radially non-monotonic" profile has a varying optical property that does not simply stay the same, rise steadily, or decrease steadily along a radius from a central point. Preferably, the continuous films described herein have a radially non-monotonic refractive index profile, more preferably a radial refractive index profile that has at least two inflection points (points at which the increasing or decreasing refractive index reverses direction), even more preferably at least three inflection points, most preferably at least four inflection points. Each of these inflection points can be selectively controlled to be at any location within the optical element. The refractive index profile is determined parallel to the surface of the continuous film or, if the film surface is curved, parallel to a plane tangent to the curved surface.

The methods described herein also enable the manufacture of optical elements having an angularly non-monotonic profile in an optical property. An "angular" profile is measured along an arc defined by a radius from a central point and is also determined parallel to the surface of the continuous film or, if the film surface is curved, parallel to a plane tangent to the curved surface. The length of arc along which the angular profile is measured is 45° (or less, if the configuration does not permit a 45° measurement). Thus, an "angularly non-monotonic" profile has a varying optical property that does not simply stay the same, rise steadily, or decrease steadily along a 45° arc at a particular radius from a central point. Preferably, the continuous films described herein have an angularly non-monotonic refractive index profile, more preferably an angular refractive index profile that has at least two inflection points (points at which the increasing or decreasing refractive index reverses direction), even more preferably at least three inflection points, most preferably at least four inflection points. Each of these inflection points can be selectively controlled to be at any location within the optical element.

Preferably, micro-jet methods generally known to those skilled in the art are used to deposit the polymer compositions onto the substrate. These micro-jet methods provide excellent control over the position and amount of polymer deposited. The polymer compositions are preferably projected by a PPDS in the form of polymer droplets onto adjacent locations on the substrate so that the resulting solid polymer pixels are adjoining. Such adjacent deposition preferably results in a continuous polymer film, and also tends to facilitate blending. Various droplet sizes and size distributions can be used. Droplet size is preferably selected to provide the desired gradation of properties in the resulting optical element. For example, smaller droplets tend to produce smaller pixels and thereby provide finer spatial resolution and finer control of refractive index. The volume of the polymer droplet (and the corresponding deposited droplet) may vary, depending on the size desired for the pixel, and is preferably about 20 microliters or less, more preferably about 2 microliters or less, most preferably about 0.2 microliter or less.

Polymers that do not form compatible blends are preferably deposited onto the substrate in the form of very small deposited polymer droplets that do not intermix and that are adjacent to one another. The size of these deposited polymer droplets is preferably small enough so that the resulting scattering in not significant. Scattering depends on the size of the deposited polymer droplets relative to the wavelength of the impinging radiation. When the deposited polymer droplets are small relative to the wavelength, the eye or observing instrument cannot resolve the separation between the individual deposited polymer droplets and thus pixels are formed optically by averaging the optical properties of the individual deposited polymer droplets. For visible light, the average size of the deposited polymer droplets is preferably about 0.4 micron or less, more preferably about 0.2 micron or less.

Polymer compositions are preferably prepared by considering the desired optical properties of the resulting continuous film. For example, for continuous films in which the adjoining polymer pixels comprise a mixture of a first polymer and a second polymer, the first polymer preferably has a refractive index that is different from the second polymer, so that polymer pixels having a range of refractive indices can be prepared. Preferably, the first polymer has a refractive index of about 1.5 or less, more preferably about 1.45 or less. Preferably, the second polymer has a refractive index greater than 1.5, more preferably about 1.6 or greater. For polymer pixels that contain metals or nanoparticles, e.g., high refractive index nanoparticles, the adjoining solid polymer pixels may each comprise the same type of polymer. The amount and/or type of metals and/or nanoparticles present are preferably adjusted to provide the desired refractive index profile. The amounts of the constituents in the polymer compositions and mixtures thereof that produce the desired optical property in the resulting solid polymer pixels can be estimated using the well known rule of mixtures, then refined by routine experimentation. Alternatively, the index profile can also be controlled by incorporating low index nanoparticles thereby producing lower index of refraction pixels. For example, to maximize the dynamic range of the index of refraction using a device as depicted in FIGS. 1A and 1B, the first spray head 110 may contain a first polymer composition which comprises a high index polymer and high index nanoparticles (and/or a metal), and the second spray head 115 may contain a second polymer composition which comprises a low index polymer and low index nanoparticles. Thus, the index of refraction difference between the first and second polymer compositions may be further enhanced by the addition of the nanoparticles.

Computers and controllers are referred to herein are broad terms that refer to devices such as microprocessors, microcontrollers and similar programmable electronic devices. These devices preferably comprise hardware, firmware and/or software configured to control the operations of the systems described herein in accordance with the steps and methods set forth. Preferably, a computer is used to control the projection of the polymer compositions so that the correct amount of each is deposited at the various locations across the substrate to obtain the locally desired optical property. As used herein, the term "computer" is a broad term that refers to any device that computes, especially a programmable electronic machine that performs high-speed mathematical or logical operations or that assembles, stores, correlates, or otherwise processes information. Thus, a preferred embodiment provides a computer programmed to direct the operations of a PPDS to prepare an optical element as described herein.

Greater thickness of the deposited polymer film generally produces greater dynamic range in optical path difference. By controlling the net amount of polymer material deposited at all locations, an optical film of any desired thickness may be formed. This can be accomplished in a single pass of the spray head, or with multiple passes. If desired, the viscosity of a deposited film can be increased by, e.g., partial curing of any pre-polymers after each pass of the spray head. In preferred embodiments, differences in the materials from which the solid polymer pixels are made produce at least part of the desired radially non-monotonic profile in the optical property. The desired radially non-monotonic profile can also be achieved by combining both effects, i.e., by utilizing differences in the materials from which the solid polymer pixels are made and by varying the thickness of the film at various points. Thus, these embodiments are distinguished from optical elements in which only the shape or thickness of the optical element is used to vary the optical properties.

Preferably, the substrate surface is adjusted so that the deposited polymer droplets do not spread excessively or bead up excessively and fail to wet the substrate. Surface wetting can be affected by coatings or treatments applied to the substrate. Preferred surface treatments are selected from the group consisting of applying a surfactant, increasing surface energy, decreasing surface energy, increasing hydrophobicity, and decreasing hydrophobicity. Methods for carrying out these treatments are known to those skilled in the art. For example, surface energy can be increased by plasma treatment of the surface. Increased surface energy typically results in more spreading and better wetting of the substrate. Suitable equipment for carrying out various surface treatments is commercially available, e.g., from Tri-Star Technologies of El Segundo, Calif. In addition to, or instead of, such surface treatments, a thin coating may be applied to the substrate surface prior to deposition of the polymers as is typically done in the case of inkjet overhead transparencies. This coating may consist of an absorbing layer, or it may be a non-absorbing layer with suitable wetting characteristics.

Prior to the curing of deposited polymer droplets that contain pre-polymers or monomers, the deposited polymer droplets are preferably allowed to mix and/or diffuse into one another sufficiently that the resulting index variation is smooth, thus minimizing any scattering or spatial frequency noise associated with abrupt index variations from pixel to neighboring pixel. The time required for this diffusion is preferably controlled so that adequate diffusion occurs, but also to prevent excessive diffusion that could affect lower spatial frequencies of the index profile that it may be desirable to maintain. Projecting a larger quantity of smaller polymer droplets, and/or overlapping the pixels as they are deposited on the substrate, tends to decrease the diffusion time. The diffusion time also depends upon the polymer viscosities and the temperature, and is preferably determined by routine experimentation. Inadequate diffusion may be observed as index variations on the scale of the solid polymer pixels using a microscope equipped with differential interference contrast (DIC). A phase-shifting interferometer, commercially available from Zygo Corporation, in Middlefield, Conn. may be used to ensure that the correct overall optic is obtained and that excessive diffusion has not taken place.

There are a variety of modes in which the optical element can be formed, including a free-standing film mode, a coating mode, and a sandwich mode. For example, a continuous film may be formed on the surface of a non-stick substrate, then peeled from the substrate to form a free-standing film. Alternatively, a continuous film may be applied to the free surface of an optical substrate, or sandwiched between two substrates.

The sandwich mode has the advantage that thickness is controlled, and the surfaces of the continuous film are forced to be optically flat. There is essentially no free surface of the polymer film, so that any environmental requirements on the polymer may be relaxed. For example, an environmental requirement might be for the exposed polymer surfaces to resist scratches or absorption of moisture. The surface of the continuous film need not satisfy these requirements if it is protected between two substrates. In the sandwich mode, the continuous film may also act as an adhesive. For example, such a sandwich mode may be formed by first projecting polymer droplets upon one substrate as described elsewhere herein to form a continuous film comprising adjoining polymer pixels, and then subsequently applying a second substrate to the free surface of the continuous film. Preferably, the thickness of the continuous film is not substantially changed, in order to minimize distortion of the optical property profile formed by the solid polymer pixels. If the deposited polymer droplets comprise a prepolymer, curing may take place before or after the second substrate is applied. If the viscosity of the deposited prepolymer-containing droplets is sufficiently high, curing may be obtained with no outside support of the two substrates. If the volume change of the prepolymer-containing droplets during curing is negligible, then the separation of the substrates can be controlled with solid shims located at the edges of the substrate. If the shrinkage of the prepolymer-containing droplets is not negligible, then compressible shims may be utilized. Alternatively, beads with diameter equal to the desired substrate separation and with refractive index matched to the average index can be added to the prepolymer-containing droplets. Preferably, the index matched shim beads are deposited only in those regions of the optic that are intended to have constant index, and not in the areas of rapidly varying index.

Another way of practicing the sandwich mode is by first projecting polymer droplets upon one substrate as described elsewhere herein to form a continuous film comprising adjoining polymer pixels, and then subsequently depositing a coating onto the continuous film. In this manner, for example, a scratch-resistant coating may be applied to protect the underlying continuous film. The coating may be applied by traditional coating techniques or by PPDS methods known to those skilled in the art, or by the deposition methods described herein (preferably without varying the composition of the projected droplets, so that an optically uniform coating results).

Another mode is to apply the pre-polymer film to the free surface of an optical substrate and cure it or otherwise solidify it in that position, as an external coating. Preferably, such a polymer film has adequate environmental properties such as hardness and moisture resistance. One advantage of this mode is that only one substrate is required. Preferably, the free surface of the cured polymer film is optically smooth. To cause this to occur, the viscosities of the polymer compositions are preferably such that the deposited polymer droplets are self-leveling. A final polishing or machining including diamond turning may be utilized.

The optical elements described herein are useful in a variety of applications. In one embodiment they are used in the form of a correcting optic for microscopes, telescopes, binoculars, cameras and other optical instruments. In another, they are used in the form of a thin film correcting optic incorporated into eyeglasses to remove low and high order aberrations of the human eye to improve vision beyond the current state of the art, which currently only corrects for cylinder and focus errors.

Figure 7A:
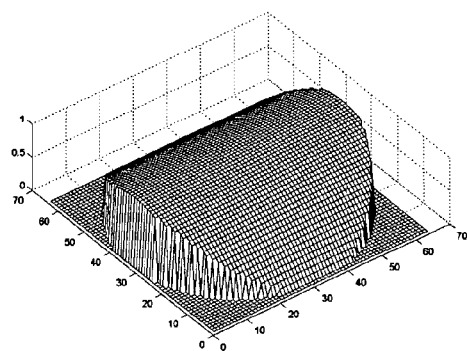
FIG. 7 shows diagrams of wavefront profiles for various types of vision or optical instrument aberrations.
Figure 7B:
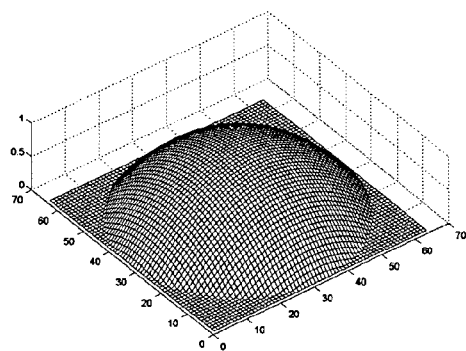
Figure 7C:
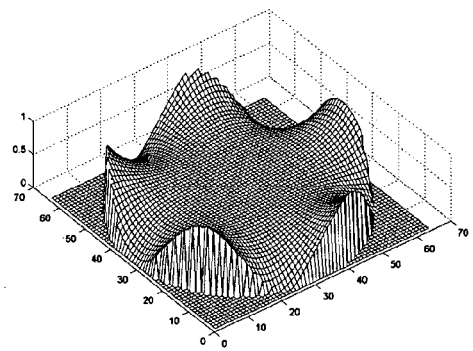
Figure 7D:
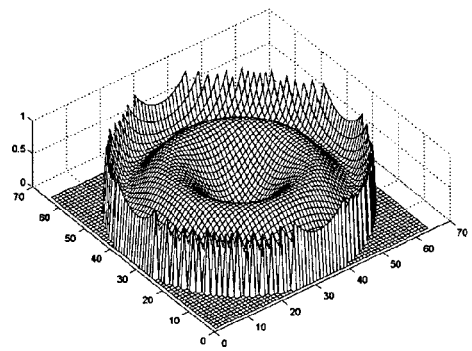
Figure 7E:
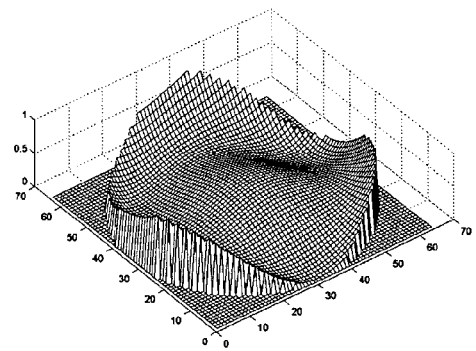
Figure 7F:
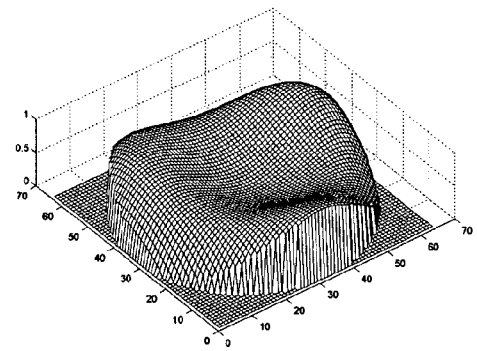

Conventional glasses correct only for cylinder and focus errors of the human eye. Examples of these aberrations are shown in the wavefront profile plots illustrated in FIGS. 7A and 7B. The vertical axis (height) of the plots represents the extent of distortion of the wave front. Human eyes may include, in addition, higher-order wave front aberrations that are not describable in terms of cylinder and focus. These aberrations, however, may be described in terms of Zernike polynomials. Plots illustrating some representative examples of high-order Zernike polynomials are shown in FIGS. 7C–7D. FIG. 7E depicts a measurement of the combined low and high order wave front aberrations in the eye of a human subject. FIG. 7F depicts an index of refraction profile correcting the aberration of the human eye in FIG. 7E.

Figure 8:
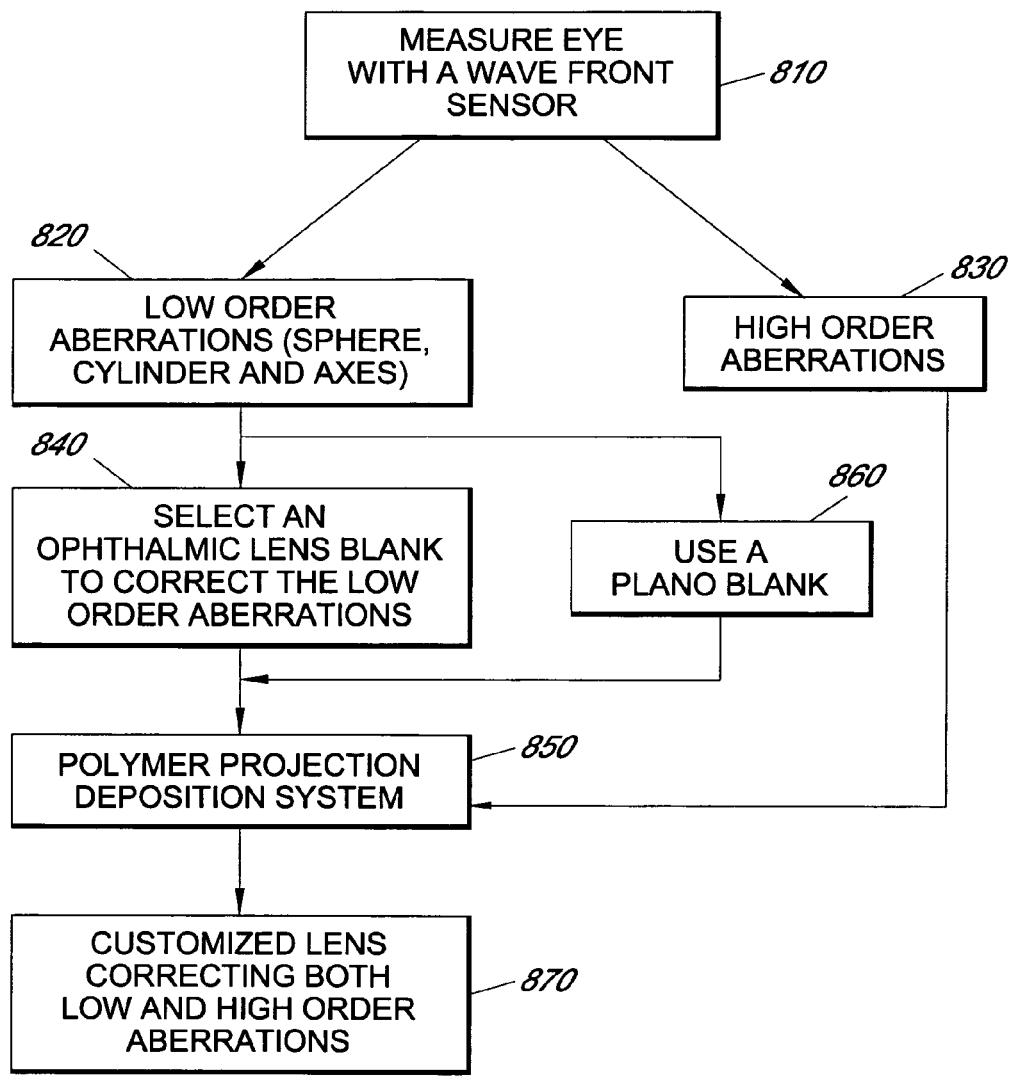
FIG. 8 is a flow chart illustrating an embodiment for making a lens that corrects for specific aberrations in the human eye.

The methods described herein can be applied to correcting both low and high order aberrations. In FIG. 8, a flowchart is shown illustrating a method of manufacturing a vision correction device. A measurement is first made 810 to determine the wavefront aberrations of the patient eye. The aberrations can be generally divided into two categories, the low order aberrations 820, consisting of sphere, cylinder and axis, and the high order aberrations 830 including various orders of coma, trefoil, and spherical aberration. Methods for measuring such wavefront aberrations are well known and can be conducted with commercially available instruments, as demonstrated in FIG. 7F. Next, an ophthalmic lens blank is selected 840 which corrects at least a portion of the low order aberration in a manner similar to what is currently provided by an optometrist. Then, a PPDS 850 as described herein is used to deposit a continuous film on the ophthalmic lens blank to produce a lens that corrects the high order aberrations when positioned in front of the patient's eye. This layer can be applied to the front or the back surface of the ophthalmic lens blank. A protective cover may then be applied. Alternatively, the film layer can be covered with a protective coating for enhancement of scratch resistance. The flowchart in FIG. 8 also shows an alternate route of selecting a plano blank 860, and the PPDS in this case is used to create a continuous film 870 that corrects both the low and high order aberrations. Thus, the optical element may correct one or more low order aberrations and/or high order aberrations, and/or any portion thereof.

Figure 9:
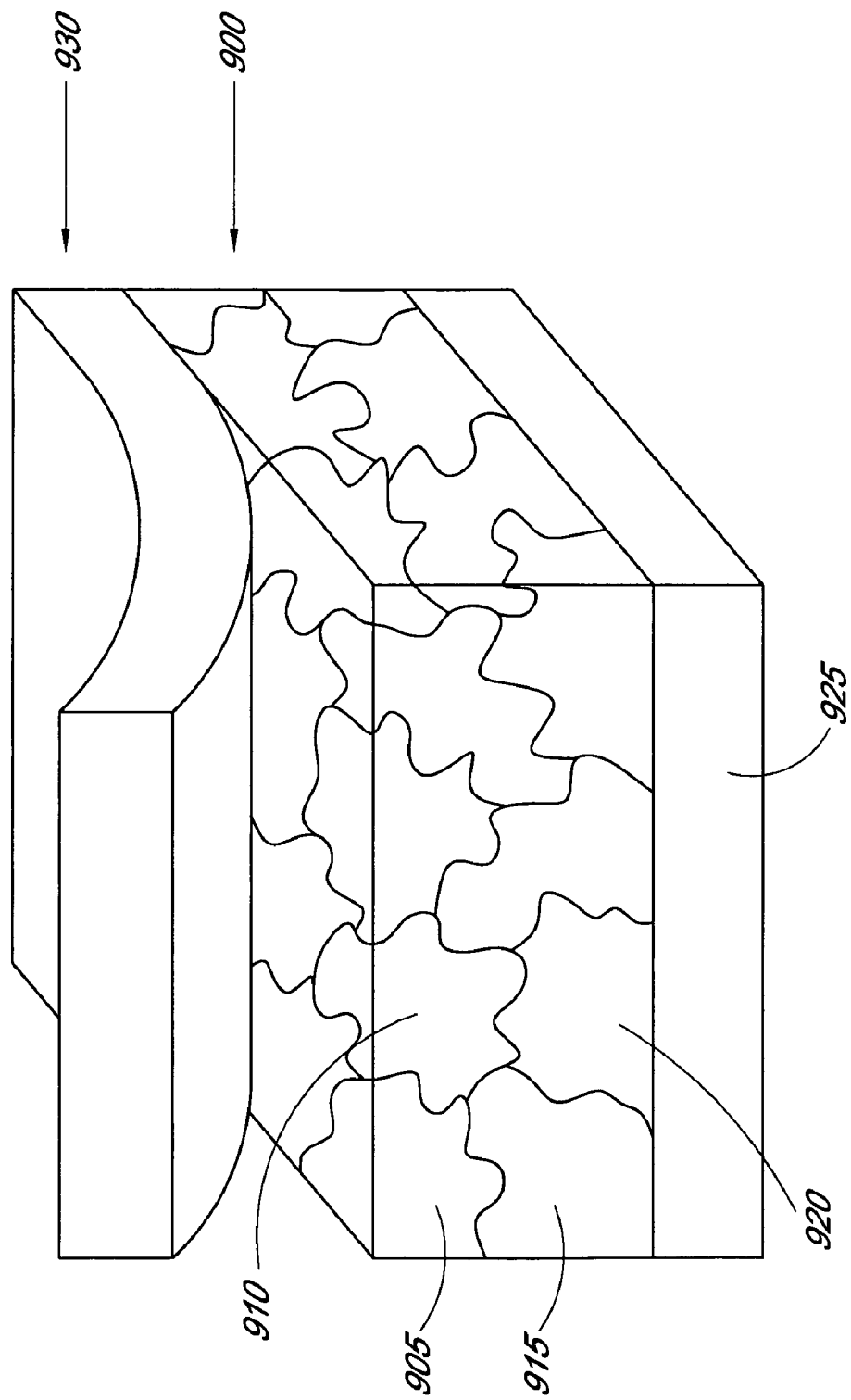
FIG. 9 is a schematic drawing illustrating a cross-sectional view of a preferred film that comprises adjoining polymer pixels.

Preferred optical elements comprise a continuous film, the continuous film comprising a plurality of solid polymer pixels. FIG. 9 is a cross-sectional perspective view illustrating such a continuous film 900. In the illustrated embodiment, a first solid polymer pixel 905 has a refractive index that is different from an adjoining second solid polymer pixel 910. In one embodiment, the first pixel 905 contains a first epoxy polymer and a second epoxy polymer in a first ratio. The first epoxy polymer has a refractive index that is different from the second epoxy polymer, so that the refractive index of the first pixel 905 is the weighted average of the individual refractive indices of the first and second epoxy polymers. The second pixel 910 contains the first epoxy polymer and the second epoxy polymer in a second ratio that is different from the first ratio. Since the ratio is different, the refractive index of the second pixel 910 is different from the refractive index of the first pixel 905. In another embodiment, the first pixel 905 and the second pixel 910 both contain the same polymer, but the second pixel 910 contains an amount of high index nanoparticles or an amount of metal additive that causes the second pixel 910 to have a higher refractive index than the first pixel 905. In the illustrated embodiment, first and second pixels 905, 910 form part of a layer that overlies an underlying layer that comprises third and fourth pixels 915, 920. The bottom side of the film 900 is shown in contact with a substantially transparent substrate 925. The top side of the film 900 may be in contact with a second substrate 930, so that the continuous film 900 forms a layer between the first substrate 925 and the second substrate 930. The film 900 has a uniform thickness in the illustrated embodiment, but may have a non-uniform thickness if desired.

In another embodiment, the methods described herein may be used to improve the resolution of viewing instruments such as telescopes, microscopes, cameras, binoculars, and ophthalmic diagnostic instruments such as confocal scanning ophthalmoscopes, as well as other instruments that contain precision optical elements such as refractive elements (e.g., lenses, prisms), reflective elements (e.g., mirrors and beam splitters), and/or diffractive elements (e.g., gratings, diffractive lenses, lens arrays, and binary optics). The methods described herein may also be used to produce lenses, prisms, reflective and diffractive elements of any dimensions. Preferably, the optical element is a lens selected from the group consisting of a lens with positive focusing power, a lens with negative focusing power, and a lens with cylindrical focusing power. In many cases the cost of manufacturing highly precise optical elements adds significantly to the cost of the resulting instrument. This cost may be reduced by providing optical elements that are initially less precise (and therefore less costly), and applying the relatively low cost methods described herein to improve their precision.

Optical elements may be used to refract electromagnetic radiation over a broad spectral range from radio waves to X-rays, including visible and non-visible wavelengths. Preferred optical elements refract electromagnetic radiation selected from the group consisting of microwave, millimeter wave, infrared, visible, ultraviolet, and X-ray. In preferred embodiments, optical elements are employed in microwave and millimeter wave systems. For example, microwave and millimeter wave antennas are often manufactured with significant aberrations that can be corrected by an optical element as described herein.

The methods and systems described herein may be combined in various ways to provide a system for making an optical element. A preferred system comprises a substrate; a spray unit charged with at least a first polymer composition and a second polymer composition, the spray unit being capable of projecting the first composition and the second composition onto a plurality of pre-selected locations on the substrate, in a plurality of pre-selected ratios of the first polymer composition to the second polymer composition; and a control unit operatively connected to the spray unit, the control unit controlling the projecting of the first polymer composition and the second polymer composition onto the pre-selected locations on the substrate, in the plurality of pre-selected ratios of the first polymer composition to the second polymer composition. Preferred polymer compositions, substrates and spray units for use in the system are described above. Preferably, the control unit comprises a computer.

Preferably, the projecting of the first polymer composition and the second polymer composition onto the pre-selected locations is controlled according to a pre-selected refractive index profile. For example, in a preferred embodiment, a measurement of the low and/or high order wave front aberrations in the eye of a human subject is obtained and used to generate a refractive index profile that corrects the aberrations. Commercially available instrumentation, e.g., the COAS™ system from WaveFront Sciences, Inc., Albuquerque, N. Mex., may be used to measure the low and/or high order wave front aberrations as shown in FIG. 7E. Aberrations may also be measured as described in U.S. patent application Ser. No. 10/014,037, filed Dec. 10, 2001, and U.S. patent application Ser. No. 10/076,218, filed Feb. 13, 2002, both of which are hereby incorporated by reference in their entireties, and particularly for the purpose of describing methods of measuring the eye and other optical systems. A refractive index profile that corrects the aberrations may then be generated as shown in FIG. 7F, in a manner known to those skilled in the art. The refractive index profile may then be input into a computerized controller operatively connected to a PPDS system as described herein and configured to produce a lens that corrects the wave front aberrations when placed in front of the eye. The measurement of the eye, generation of the refractive index profile, manufacture of the lens, and fitting of the lens to the patient may be carried out in a single location or at two or more locations remote from one another. For example, the eye may be measured by a local optometrist, who then transmits the resulting aberration information (or the corresponding refractive index profile) to a manufacturing site where the lens is produced. After production, the finished lens may then be sent to the optometrist for fitting to the patient. The manufacturer may use a lens blank as a substrate. The lens blank may itself be a lens that corrects at least a portion of the low order distortion, or may be a plano blank. The methods described herein may be used to produce lenses that correct all or part of the aberrations, including low order aberrations, high order aberrations, and/or any combination thereof. For example, in a preferred embodiment, the finished lens is a progressive addition lens (PAL).

It will be appreciated by those skilled in the art that various omissions, additions and modifications may be made to the processes described above without departing from the scope of the invention, and all such modifications and changes are intended to fall within the scope of the invention, as defined by the appended claims.

What is claimed is:

1. A spray head comprising:
    a chamber to contain at least a polymer droplet, the chamber comprising an orifice to permit the polymer droplet to be expelled from the chamber;
    a first inlet attached to the chamber to permit passage of a first solvent or a first polymer composition into the chamber;
    a first valve attached to the first inlet, the valve being adjustable to allow a pre-selected quantity of the first solvent or the first polymer composition to enter the chamber from the inlet;
    a second inlet attached to the chamber to permit passage of a second solvent or a second polymer composition into the chamber;
    a second valve attached to the second inlet, the valve being adjustable to allow a pre-selected quantity of the second solvent or the second polymer composition to enter the chamber from the inlet; and
    an actuator operatively disposed to expel the polymer droplet from the chamber.

2. The spray head of claim 1 in which the first valve is controlled by a computer, thereby enabling the computer to control the quantity of the first solvent or the first polymer composition entering the chamber.

3. The spray head of claim 2 in which the second valve is controlled by the computer, thereby enabling the computer to control the quantity of the second solvent or the second polymer entering the chamber.

4. The spray head of claim 1, further comprising means for pressurizing at least one fluid selected from the group consisting of the first polymer composition, the first solvent, the second polymer composition and the second solvent.

5. The spray head of claim 1, further comprising means for drawing at least one fluid into the chamber, the fluid being selected from the group consisting of the first polymer composition, the first solvent, the second polymer composition and the second solvent.

6. A spray head comprising:
    a mixing chamber to contain a polymer droplet, the mixing chamber comprising an orifice to permit the polymer droplet to be expelled from the mixing chamber;
    a first inlet connecting the mixing chamber to a first reservoir, the first inlet to permit passage of a first solvent or first polymer composition into the mixing chamber from the first reservoir;
    a first actuator operatively disposed to expel a pre-selected quantity of the first solvent or first polymer composition from the first reservoir into the mixing chamber and, optionally, out of the orifice as a first constituent of the polymer droplet;
    a second inlet connecting the mixing chamber to a second reservoir, the second inlet to permit passage of a second solvent or second polymer composition into the mixing chamber from the second reservoir; and
    a second actuator operatively disposed to expel a pre-selected quantity of the second solvent or second polymer composition from the second reservoir into the mixing chamber and, optionally, out of the orifice as a second constituent of the polymer droplet.

7. The spray head of claim 6 in which the first actuator is controlled by a computer, thereby enabling the computer to control at least one quantity selected from the quantity of first solvent entering the mixing chamber and the quantity of first polymer composition entering the mixing chamber.

8. The spray head of claim 7 in which the second valve is controlled by the computer, thereby enabling the computer to control at least one quantity selected from the quantity of second solvent entering the mixing chamber and the quantity of second polymer entering the mixing chamber.

* * * * *